June 12, 1934.                B. M. LEECE                1,962,994
                              SPRING DRIVE
                           Filed June 9, 1932
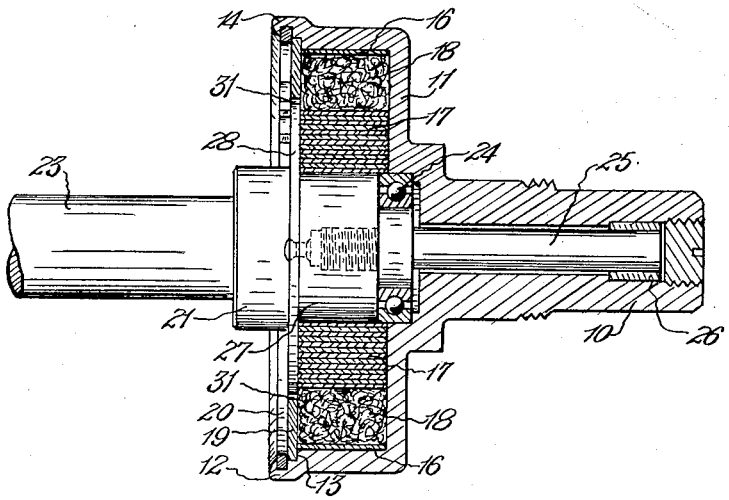
FIG.1
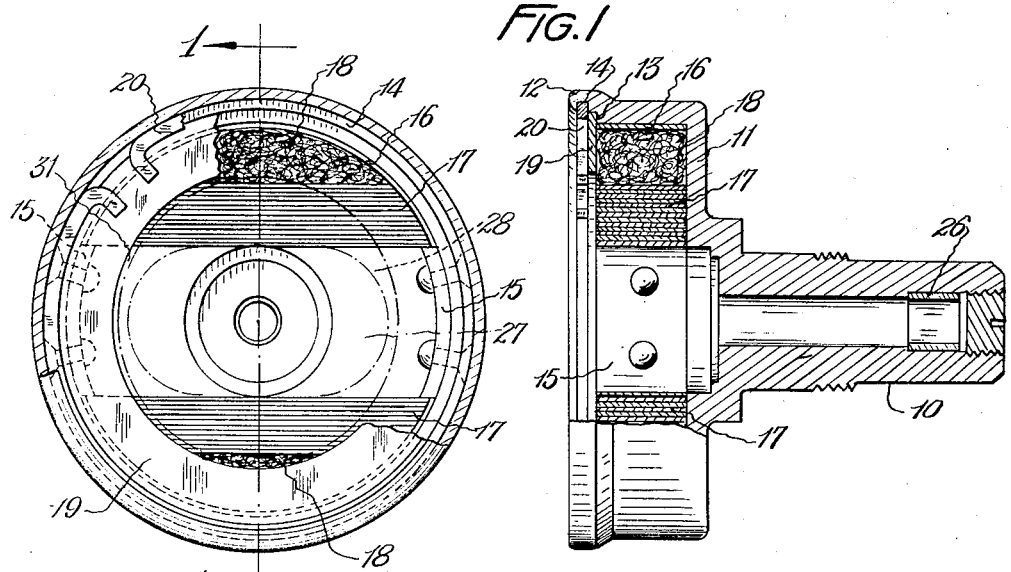
FIG.3           FIG.2
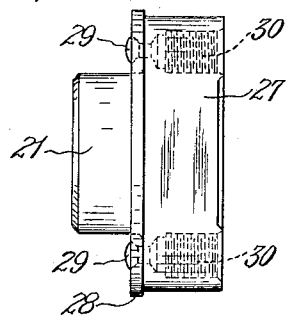   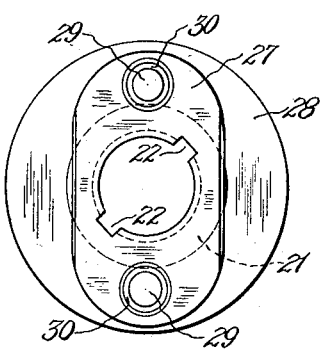
FIG.4            FIG.5
INVENTOR:
BENNETT M. LEECE
Kwis Hudson & Kent.
ATTORNEYS Patented June 12, 1934

1,962,994

UNITED STATES PATENT OFFICE 1,962,994

SPRING DRIVE

Bennett M. Leece, Cleveland, Ohio, assignor to The Leece-Neville Company, Cleveland, Ohio, a corporation of Ohio Application June 9, 1932, Serial No. 616,276

3 Claims. (Cl. 64—96)

This invention relates to improvements in spring drives, particularly drives connecting aligned shafts which are subject to sudden speed changes such as occur for instance in flexible couplings between the internal combustion engine and the generator of an airplane, where sudden changes in speed are inevitable, as when the propeller enters or leaves an air pocket.

In certain respects the invention of the present application is an improvement upon my copending application Serial No. 489,056 filed October 14, 1930.

One of the objects of the invention is the provision of a new and improved closure for the coupling effective to retain the lubricant employed therein, capable of being easily and quickly assembled, presenting no friction in the operation of the device, and not likely to work loose.

Other objects and features of novelty will appear as I proceed with the description of that embodiment of the invention which, for the purposes of the present application, I have illustrated in the accompanying drawing, in which Figure 1 is a view, principally in longitudinal section, of a coupling embodying the invention.

Fig. 2 is a longitudinal section of the cup-shaped member only of the coupling.

Fig. 3 is a front elevation of the cup-shaped member, parts being broken away and other parts shown in section in order to more fully illustrate the invention.

Fig. 4 is a side elevation of the cam member of the coupling, and

Fig. 5 is a front elevation of the same.

In the drawing, 10 indicates a spline shaft which is adapted to be set into a suitable rotating receptacle operatively associated with an internal combustion engine, the receptacle being suitably geared to the crank shaft of the engine. Integral with the shaft 10 there is a forged cup 11 having a rim 12 provided with an annular shoulder 13 and with a groove 14 just beyond the shoulder. At diametrically opposite points I rivet to the circular side wall of the member 11 a pair of arc-shaped shoes 15. Hardened steel liners 16 are positioned against the side walls between the shoes 15, and held in place thereby. A multiple leaf spring 17 is inserted into the cup above each liner 16 and behind each pair of shoes 15, the inner leaf of each spring bearing at its ends against the adjacent end surfaces of the shoes 15, and the other leaves being graduated as to length so as to fit within the liner 16. The various leaves of each spring are independent, so that relative movement during flexure is possible.

Some suitable means is provided for limiting the deflection of the springs, and I prefer to employ for this purpose a cushion 18 in the form of a felt pad. These pads constitute cushioned stops for the springs serving to dampen any vibratory action of the springs which might take place. They also act as sponges to hold lubricant, which is squeezed out when the springs flex and reabsorbed when they straighten out again.

After the cushions 18 and springs 17 are assembled into the cup-shaped member 11, a flat ring 19 is placed in position against the shoulder 13, and then a spring ring 20 is caused to snap into position within the groove 14, the latter ring being of sufficient width to overlap slightly the outer edge of the flat ring 19, whereby the latter ring is locked firmly in place. The ring 19 acts as a retaining plate for the outer edges of the springs 17 and also for the cushions 18.

The second member of the coupling is illustrated in detail in Figs. 4 and 5, and comprises a hub 21 that is provided with keyways 22, by means of which the member may be locked to the shaft 23 of a generator (not shown), which shaft may be centered and mounted for slight relative rotation in the cup member by a ball bearing 24. The shaft may also have an extension 25 of smaller diameter rotatably mounted in a bushing 26 carried in the extremity of spline shaft 10. This mounting of the shaft is described more in detail and covered by the claims of my copending application Serial No. 403,700, filed October 31, 1929. Integral with the hub 21 there is a cam 27 which, in this instance, comprises substantially parallel sides, the width of the cam between these sides being substantially the same as the distance between the inner leaves of the two springs 17, or slightly greater than the normal distance between the springs in order that the latter may be put under a slight tension when the two members of the coupling are assembled. The ends of the cam 27 are preferably rounded, as clearly shown in Fig. 5. Whenever there is relative movement between the two parts of the coupling the rounded ends of the cam flex the springs 17 more or less, and the force thus stored up acts thereafter to accelerate or retard the movement of the shaft 23, as the case may be, in order to give it a new rate of rotation uniform with the new rate of rotation of the shaft 10. By this means resiliency in the drive is provided, and strain and damage to the coupling and associated parts is prevented.

On the hub 21, directly adjacent the cam 27, I mount a closure disc 28 which may be secured to the cam 27 by means of rivets 29 set into openings 30 in the cam 27. While this arrangement is preferred for manufacturing reasons, obviously the disc 28 could be made integral with the hub 21 and cam 27 if desired. The openings 30 may be threaded, if desired, for the reception of pull-out rods, not shown.

The dimensions of the various parts are such that when the two coupling members are assembled the disc 28 comes into the same plane with flat ring 19, and the diameter of the disc 28 is such that a very small clearance 31 remains between the disc and the inner edge of the flat ring 19. In practice I make this clearance about 1/32nd of an inch which is not sufficient to permit any appreciable loss of lubricant in operation but is sufficient to insure against any contact between the disc 28 and the ring 19, and hence prevents friction being set up between these two elements, constituting the cover or protector of the coupling. In other words, the plate 28 and the ring 19 together form an almost complete closure for the cup-shaped member 11, within which closure the cam and springs as well as the cushions are mounted. Since the fit between the ring 19 and the rim of the cup member 11 is a close one no leakage of lubricant can take place there, and since the small clearance 31 is well in from the periphery of the coupling, centrifugal force tends to hold the lubricant out away from the side walls of the cup-shaped member and away from the clearance 31. Loss of lubricant through the latter opening is therefore very slight.

The use of the spring ring 20 as a means for fastening the flat ring in place not only facilitates the assembly and disassembly of the coupling, but is of distinct advantage in that this means of fastening includes no screws or other securing means that might work loose in the operation of the coupling. Furthermore, since there is no friction upon ring 19, due to contact with any part of the cam member of the coupling, there is nothing to impart any loosening force to the ring 19.

Having thus described my invention, I claim:

1. A flexible coupling for aligned driving and driven shafts subject to sudden speed changes, comprising a first coupling member adapted to be attached to one of the shafts, said first member having a cup-shaped portion, a second coupling member adapted to be attached to the other shaft and extending within said cup-shaped portion, yieldable driving connections between said members, and a closure carried partly by each of said members, said closure comprising a ring mounted in the rim of the cup-shaped member, and a circular disc carried by the second coupling member in the same plane with said ring and separated therefrom by a narrow clearance sufficient to prevent contact during the operation of the coupling.

2. A flexible coupling for aligned driving and driven shafts subject to sudden speed changes, comprising a cup-shaped member adapted to be attached to one of said shafts, leaf springs mounted within the cup-shaped member transversely thereof and spaced away from the center, a second coupling member adapted to be attached to the other shaft and comprising a cam axially positioned within the cup-shaped member for engagement with said springs, a ring mounted in the rim of the cup-shaped member, and a circular disc carried by said cam in the same plane with said ring with an intervening clearance sufficient to prevent any possible contact between the ring and disc during the operation of the coupling, said disc extending radially outward beyond said springs.

3. A flexible coupling for aligned driving and driven shafts subject to speed changes, comprising a cup-shaped member adapted to be attached to one of said shafts, a second coupling member adapted to be attached to the other shaft positioned within said cup-shaped member, yieldable driving connections between said members located within the space surrounded by said cup-shaped member, said cup-shaped member having an annular shoulder therein adjacent its rim and an annular groove just beyond said shoulder, a flat ring resting against said shoulder, and a spring ring mounted in said groove engaging the outer surface of said flat ring, said second coupling member carrying a circular disc in the same plane with said flat ring of a diameter to clear said ring sufficiently to avoid any possibility of contact between the ring and disc during the operation of the coupling.

BENNETT M. LEECE.